Jan. 1, 1957
A. R. MORRISON
2,775,860
TWINE
Filed March 28, 1951
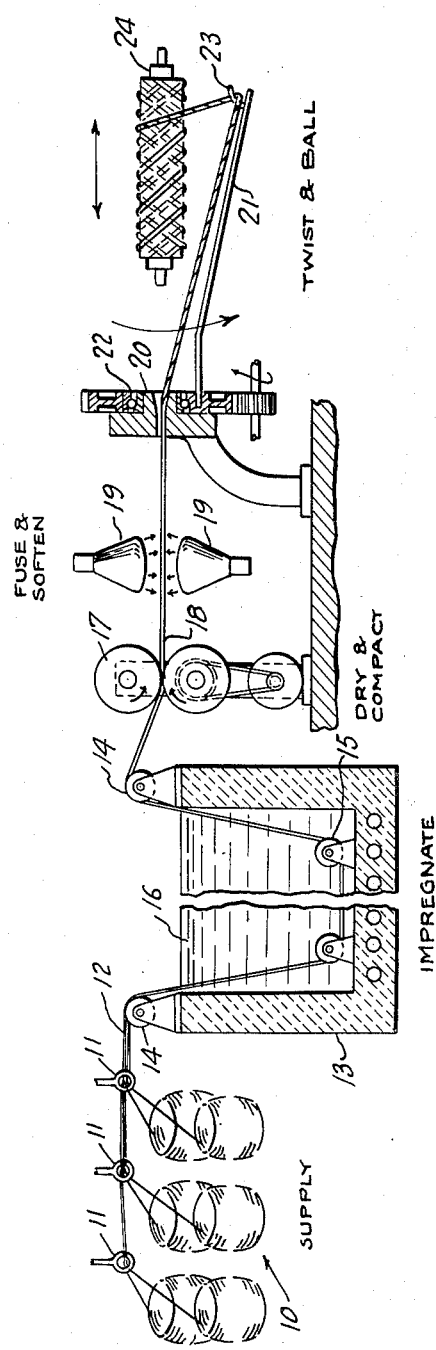
INVENTOR.
Albert R. Morrison
BY
ATTORNEYS

2,775,860

TWINE

Albert R. Morrison, Newark, Ohio, assignor to Owens-Corning Fiberglas Corporation, a corporation of Delaware Application March 28, 1951, Serial No. 217,944

4 Claims. (Cl. 57—140)

This invention relates to twine and to a method for fabricating the same and, more particularly, to a method of fabricating baler and the like, tough, bulky twines from glass fibers.

Tough twines such as baler and binder twines, twine used for knotting newspaper bundles and other high production, high strength applications, have been, for the most part, fabricated from natural fibers, such as hemp, sisal, and the like. The supply of these natural fibers unfortunately depends not only upon the normal workings of supply and demand, but also, because of the temperatures and the climates in which they can be produced in appreciable quantities, upon worldwide economic and political situations. In the course of recent history, plantations for the production of fibers such as hemp and sisal have been very seriously reduced in number and capacity by the scourges of war and economic disruption.

Many attempts have been made to provide substitute materials which have the necessary qualities for satisfactorily functioning in baler, binder and the like twines. Twines for such purposes must not only have high tensile strengths but they must also have very high knot strengths. By knot strength is meant the strength of a twine in tension acting through a knot, i. e., a twine being tested is tied in a simple overhand knot and then the tensioning apparatus applied to two ends with the knot therebetween. While high tensile strengths are relatively easy to achieve, high knot strengths without either excessive bulk or difficulties in tying have not been successfully provided in synthetic or substitute materials. Metal wires have been used in some applications, but the factors of cost and scarcity are such as to also make metal unsuitable for many purposes.

Many natural and synthetic materials which might appear useful for tough twines either are too costly for commercial use or fail to meet other essential requirements such as the ability to retain a round shape when tightened and not to flatten out in knotting machinery or to slide over the surface of the hay or other material in the baling machine or, if slippery enough to do so, to hold a knot tightly; or to resist the abrasive effect of sliding over the material being tied.

It is, therefore, the principal object of this invention to provide an improved baler or the like twine and a method for its fabrication from continuous strands of glass fibers so treated during the practice of the invention or by the apparatus embodying the same that the twine not only has the high tensile strength to be expected from the glass fiber material but also has high knot strength in proportion to its tensile strength.

More specifically, this invention comprises the preparation of baler twine from a substantial number of strands of continuous glass fibers coated with combinations of certain hard resins and elastomers.

It is a still more specific object of this invention to provide a baler twine comprising glass fibers coated with a set up coating and binding material comprising admixtures of a synthetic elastomer and a hard thermosetting or high melting thermoplastic resinous material (for example phenolic resin or a resin made from the residue remaining after separation of refined rosin from the resinous extract of pine wood or similar resins) which, when polymerized or set up form relatively hard, though not inflexible coatings; the combination of relatively stiff resin with the flexible elastomer providing an impregnant serving to retain individual fibers and strands in the twine, to retain the twist in the twine, and also giving the surface of the twine desirable characteristics of slipperiness; the elastomer providing for the flexibility required for enabling the twine to be bent around things to be tied and to be knotted.

It is yet another object of this invention to provide a method for the fabrication of a twine such as that just described in which the method is wholly continuous and functions to produce a twine which can be tightly knotted without abrading individual glass fibers or strands or cracking the individual fibers away from each other, thereby retaining a knot strength relatively high with respect to the tensile strength of the twine.

These and other more specific objects and advantages will be more apparent from the specification and from the drawing which is diagrammatical in nature and which illustrates the steps performed in the method embodying the invention and apparatus by means of which the invention can be carried out for the production of a new improved baler or the like twine.

In the fabrication of twine according to the invention the ultimate tensile and knot strengths required in the finished twine are determined by the application to which the twine is to be put. For example, in baling hay it has been found necessary that baler twine have a knot strength in the order of 150 pounds and ordinary commercial sisal twines customarily used for this purpose have been found to average about 140 pounds in knot strength. The knot strength of the sisal twine for any particular application is, of course, determined by the number of sisal fibers occurring at any one point in the twine and is controlled in the manufacture by the number of fibers introduced and the degree to which the slivers of sisal fibers are combed or drafted.

In the fabrication of sisal twines, since each fiber of sisal is rarely longer than 40 inches, the fibers must be orientated into longitudinal parallelism and grouped transversely before they can be twisted to form the twine. In the practice of the instant invention, however, since glass fibers are obtainable in practically any lengths and are, indeed, most easily handled in spools each containing thousands of yards, the drafting and orientating steps required in manufacturing sisal and similar fibers are eliminated. The elimination of the machinery, time and labor involved in the orientation of sisal fibers from the process or method of fabricating baler twine herein disclosed, offsets what is sometimes alleged to be a substantial cost advantage in the natural fibers as against glass fibers.

In the practice of the instant invention there is maintained a supply consisting of a plurality of spools 10 (or a similar supply) of glass fiber strands each of which strands consists of some 200 individual fibers or filaments, that are substantially continuous, each filament extending without interruption through the length of the strand. The "continuous filament" glass strands are preferred in the present invention because of their ease in handling, high tensile strength, and other properties. Individual strands (only six of the spools being shown in the drawing) may be accumulated into a continuous associated group through the use of gathering eyes 11 in sufficient number to properly accommodate the numerous sources of supply, for example, the spools 10. The actual number of individual strands of fibers depends upon not only the desired tensile and knot strengths of the finished twine but also, of course, on the strength of the individual fibers and strands being used.

After the individual fibers have all been gathered into a loosely associated group 12, they are, as a group, coated with one of a number of impregnants which may be contained, for example, in a heated tank 13, by running the group 12 over and under pulleys 14 and 15 which lead it down into and out of the tank 13 containing an impregnant 16.

The impregnant 16 thoroughly coats the fibers and strands, serving, first, to unify the strands for subsequent drying and handling prior to twisting and, second, to hold the strands in twisted condition and to impart characteristics of greatly increased knot strength, stiffness, unity, surface slipperiness, etc., to the finished twine. The constituents of the impregnant will be discussed at length below.

After the group or bundle of strands 12 leaves the tank 13 it may be run between a pair of heated pressure rollers 17 to drive off water in the event that the admixture is an aqueous solution or emulsion of the substances and to otherwise dry the strands. At the same time, of course, the resin is at least partially polymerized or hardened and begins to stiffen. The strands are orientated generally parallelly of each other between the rollers 17 and are compressed into a thin flat ribbon 18. The width and thickness of the ribbon 18 depends not only upon the number of glass fiber strands being employed (which, of course, is determined in a substantial part of the ultimate knot and tensile strengths desired and the weight of each strand) but also by the speed of longitudinal progression of the group, the pressure between the two rollers 17 and the temperature to which they are heated.

In place of the pressure rollers 17 which serve both to dry and compress the coated strands, the strands may be taken directly from the heated coating tank 13 into an air circulation chamber where heated dehumidified air may be circulated both to remove the moisture and to initiate polymerization or setting up of the resin. In this variation in the step of drying the coated strands, the strands may not assume a ribbon-like orientation but may continue as a generally loosely associated group.

After the group or ribbon 18 has left the heating chamber or preferably the heated pressure rollers 17, it passes through a heating area. It may, for example, be run between a pair of heating tubes 19 or through a second heated chamber, the purpose of this treatment being to soften the impregnant so as to bind the glass fiber strands when twisted as a group. The twisting step may be accomplished by any one of a number of known devices, that illustrated in the drawing being a twisting machine having a central orifice through which the twine is led to a high speed rotary flyer 21 mounted on a bearing 22 and with an eye 23 at the end of its arm. The flyer 21 is revolved around a reciprocating, rotating spindle 24 on which a spool 25 is removably mounted. The spindle 24 is reciprocated in timed relation to the revolution of the flyer 21 so that as the flyer revolves around the spindle the spool 25 is carried back and forth to lay up the twisted twine in overlapping helical turns. The relationship between the speed of the flyer, the speed of the, for example, pressure rollers 17, or similar feeding means, the speed of rotation and rate of reciprocation of the spindle 24 are co-ordinated so as to twist the twine to the desired degree and to evenly wrap the twine on the spool 25.

A twister such as that rudimentarily shown in the drawings, produces what would be a "wild" yarn or twine. A "wild" twine is one in which the individual fibers or strands are not compensatingly twisted either individually or in groups, so that the twist in each fiber or strand balances the twist in all of the fibers and strands. A "wild" yarn or twine therefore normally will untwist wherever it is cut. In the practice of the method of the instant invention, however, the tendency for the yarn or twine to untwist is overcome by bonding adjacent twisted fibers and strands to each other. This is achieved by so controlling the temperatures and the speed of twisting that the resin sets up almost immediately after the fibers are twisted upon each other, the twisting actually taking place between the entrance end of the orifice 20 and the eye 23.

When a sufficient quantity of twine has been wound on the spool 25, the apparatus may be stopped, the twine cut at a point beyond the eye 23 and a new spool 25 mounted on the spindle 24. The new end of the twine may be led onto the spindle by hand and the apparatus re-energized to wind a subsequent "ball of twine."

The nature of the impregnant 16 is determined by the characteristics of glass fibers with consideration given to the desired qualities of the twine to be produced.

I have discovered that commercially satisfactory baler twines, for example, can be fabricated from glass fibers having the requisite high knot strengths when the glass fibers are properly impregnated with bonding materials selected from two general classifications. Each of these general classifications of mixtures is provided for the purpose of giving to the high tensile strength glass fibers additional characteristics necessary in strong twines.

Glass fibers have enormous tensile strengths, running in the order of 400,000 pounds per square inch, so that small bundles or groups of glass fibers and glass fiber strands exhibit much higher tensile strengths than do groups or bundles of natural fibers such as sisal or hemp of similar sizes. However, the characteristic of high tensile strength alone is insufficient to produce a satisfactory baler twine. The twine must not only be strong in direct tension but it must have a high knot strength and in the case of a twine made of glass fibers, alone, the knot strength is greatly lowered by two facts. The first of these is the abrasive effect of glass on itself and the second of these is the fact that when tied into a small knot the glass fibers turn such short radii as to greatly weaken them.

Additional requirements in twines such as baler twine are that they be so made as to prevent the random fraying of individual fibers, which is usually achieved by twisting; that they maintain their twist without becoming wild or untwisted when cut, and that they be relatively stiff in order to eliminate lashbacks and snarling in the tying mechanism.

Where glass fiber strands are used as twine material and twisted to establish their unity as twine, some means must be provided for holding them in their twisted position. I have discovered that the abrasive effect of glass on glass can be greatly reduced by coating the strands and fibers with a substance which protects them from each other and which at the same time may be made to stiffen the strands to bond the strands together and to bulk up the strands thereby to increase the radii to which they are bent at knots.

I have also discovered that other substances will render the twine sufficiently flexible to be handled without destroying the stiffening effect of the first constituent and without permitting the individual fibers and strands to become untwisted and secondly will so coat the fibers and strands that they are slippery enough to slide over the material, such as hay, which is being baled and yet will hold a knot when tied.

The constituents of the impregnants I have employed for practicing the process of the instant invention and for fabricating baler twine from glass strands, may be divided into two general groups of constituents. Constituent A, which is contained in the admixture through which the glass fibers are moved to thoroughly impregnate the glass fiber strands, is a relatively stiff thermosetting or high melting thermoplastic resinous material. It may, for example, be any one of a number of phenol formaldehyde resins or it may be a phenol formaldehyde resin extended with a high melting thermoplastic resin such as the pine rosin derivative product described in Bowden Patent 2,324,758 or in Hunter Patent 2,276,304; or constituent A may consist entirely of such a pine rosin derivative as described in the two above mentioned patents. This constituent apparently serves to bond the individual fibers and individual strands in the twine to each other after twisting, thus preventing the twine from untwisting where it is severed. This constituent also stiffens the twine so that it is not limp and completely flexible as it would be if made up merely of untreated glass strands and contributes importantly to the proper surface characteristics, not only of surface slipperiness but also of resistance to abrasion.

Although, as mentioned, constituent A may consist of phenolic resin exclusively, it is preferred to use either a high melting point thermoplastic resin or a mixture including a large proportion of such a resin. This preference results from a simplification of the process when the thermoplastic is used by making the temperature at the heating tubes 19 less critical and greatly shortening the time necessary to fuse the resin. In the use of a thermoplastic, the resin can be fused easily and will remain soft enough to accept and set the subsequent twist.

I have also found that the pine rosin derivative resin described above has another advantage over the thermosetting phenolic resin which eliminates a step in the process and results in an improved twine. One of the most difficult qualities to achieve in twines is the proper amount of surface slipperiness so that the twine will slide over the surface of the material being tied without cutting in and yet will not allow the knot to slip or untie. The twine treated with the pine rosin derivative resin has excellent surface characteristics. The twine treated with the phenolic resin, while excellent from most standpoints, however, requires a subsequent waxing in order to provide the slipper surface necessary.

Constituent B which apparently provides for the characteristics of reasonable flexibility in the twine and reduction in abrading between the individual fibers or strands by maintaining the integrity of the strands of fine fibers, is selected from a group of synthetic or natural elastomers. The synthetic elastomers which may be used include both the "Buna-N" (copolymer of butadiene and acrylonitrile) and the "Buna-S" (copolymer of butadiene and styrene) types.

The ratios of admixing of the two constituents A and B, that is, of selected ones of substances from each group of constituents, may depend partially on the desired stiffness of the twine and upon the particular resin to glass ratio used. Appropriate selections and resulting qualities can be seen in the examples set forth below.

In general, it may be said, that the higher the percentage of constituent A, the stiffer the twine and the more tightly the twist is retained. Conversely, the higher the percentage of constituent B, the more flexible is the twine.

EXAMPLE 1

In the practice of the instant invention for the production of a baler twine having a knot strength of from between 150 to 160 pounds, a group of 120 glass fiber strands in which each of the strands contained some 200 filaments and ran 15,000 yards to the pound, were gathered together by running them through grouping or combing eyes to form a loosely associated group of glass fiber strands. The group of strands was continuously run through a tank containing a coating and impregnating mixture maintained at room temperature at a speed such that the impregnant picked up constituted 18% by weight of the impregnated twine. In this example the tank contained an admixture (15% by weight) in water (85%) of one part by weight of an aqueous emulsion (40% solids) of the residue remaining after separation of refined rosin from the resinous extract of pinewood (in this particular instance identified by the trademark "Vinsol"), the said residue being characterized by substantial insolubility in petroleum hydrocarbons, with two parts by weight of an aqueous dispersion (40% solids) of a partially polymerized butadiene-styrene copolymer. The coated sliver was then passed through a heating chamber maintained at 775° F. and remained in the chamber for a period of about 1 minute to drive off moisture and partially set up the constituents in the impregnant. The dried, grouped strands were then passed at the same rate of speed between a pair of heating lamps and immediately twisted into a single twist twine which was balled in the conventional manner.

The twine so fabricated was found to have a tensile strength of approximately 450 pounds. A length of the twine was knotted with a simple overhand knot and the twine so knotted was tested for knot strength in several tests, averaging about 170 pounds. Upon examination the twine was found to have a surface sufficiently slippery so as not to cut into hay being baled and a diameter approximately one-third that of comparable commercially obtainable sisal twine having a knot strength of 144 pounds. Upon examination of sample knots tied in the twine, it was found that not an appreciable number of individual fibers and strands were abraded or broken during the knotting step, sufficient being left unharmed to provide for the relatively high knot strength.

Balls of twine so fabricated were used in conventional commercial baling machines and were found to function satisfactorily both in the wrapping and tying elements of such machines which had been designed originally for the use of conventional sisal twines of the substantially larger cross sectional diameter.

EXAMPLE 2

A second twine was fabricated under conditions and having constituents identical with those of Example 1 except for the substitution of heated pressure rollers in the place of the heating chamber. The rollers were maintained at a temperature of about 500° F. and the twine merely run through them. It was found that the twine exhibited tested characteristics almost identical with those of the twine made in Example 1. In appearance and surface characteristics the twines of Examples 1 and 2 were indistinguishable.

EXAMPLE 3

A group of 240 glass fiber strands, each strand running about 15,000 yards to the pound, were gathered in the manner already described in Example 1 and treated with the admixture and under the conditions described in Example 1. The treated strands similarly were dried and the impregnating mixture similarly softened and the strands similarly were twisted. The twine so fabricated was found to have a knot strength of approximately 265 pounds and a diameter approximately the same as that of conventional sisal baler twine.

The twine fabricated in this example thus had twice as much glass (240 strands as against 120 in Example 1) but a knot strength of only 265 pounds as against 170 pounds—an increase of only 50% in knot strength for a 100% increase in glass content. From these figures, it is apparent that the constituents in the admixture very importantly modify the strength and characteristics of the twine and glass, alone, is not satisfactory nor predictable.

EXAMPLE 4

A group of 120 ends of glass fiber strands each strand running 15,000 yards to the pound was gathered continuously through gathering eyes into a loosely associated group and run through a heated tank containing an admixture of a phenolic resin, in this case a so-called "two-step" phenol-formaldehyde resin, present in a partially water soluble state and a copolymer of butadiene acrylonitrile. The constituents were admixed in the proportions of one part by weight of copolymer to two parts by weight of phenolic resin and the admixture constituted 30% of the impregnant solution. The solution was maintained at room temperature and the glass fiber strands in the associated group passed through the tank at a rate sufficient to pick up 16% by weight of impregnant in the impregnated twine.

The coated group of strands was dried in the manner set forth in Example 1 to drive off moisture and then heated to progress the polymerization of the phenolic resin to a point such that upon immediately twisting the twine it retained its twist and was not wild.

The twine so fabricated was found to have a knot strength of about 140 pounds but the surface of the twine coated with the butadiene acrylonitrile copolymer and phenolic admixture as set forth in this example was found to have a coefficient of friction with hay such that the twine slid over the hay with difficulty. A similar twine, therefore, was fabricated and after testing was given a subsequent overcoating of paraffin wax which provided a slippery surface that slid well over the hay and which, when knotted, did not pull out. The twine when coated with the paraffin wax overcoating was found to function well in conventional baling mechanisms, both wrappers and knotters, which had been designed for the use of the larger diameter sisal twine.

EXAMPLE 5

A twine was fabricated according to Example 4 but with the change in procedure as between Examples 1 and 2, i. e., using pressure rollers maintained at 500° F. in place of the heating and drying chamber. As in the case of the twines of Examples 1 and 2, the twines of Example 4 and this twine, were practically indistinguishable. As in Example 4, the surface characteristics were less desirable than in the twines of Examples 1, 2 and 3, but the surface was improved by waxing.

Many additional twines were fabricated according to the techniques of Examples 1 through 5, with the weight and number of strands of glass fibers, constituents and percentages of constituents to water in the impregnant and percent of resin or impregnant to glass, varied as in the following table; with the results indicated:

All of the twines fabricated by the method of the instant invention and as set forth in detail in the examples outlined above were commercially practicable and, in addition, had certain advantages over conventional sisal twines.

Twines fabricated according to the invention have smaller diameters than sisal twines of corresponding knot strengths and thus balls containing much greater yardage have the same size. The surface of the twine is smoother and less likely to fray. Cut ends of the twine untwist much less than twines made of unbonded sisal fibers. The materials from which the twines are made is readily available in many localities and thus the shipment and handling of the sisal fiber is eliminated. Twine can be fabricated at any location where glass fibers are fabricated or the glass fiber strands can be shipped and the twine fabricated in different locations.

I claim:

1. A strong, tough twine having superior knot strength and knot holding ability consisting in a plurality of continuous strands of glass fibers twisted together longitudinally and bonded together into a cohesive mass by a matrix consisting of an admixture in the range from about 1 to about 2 parts by weight of a hard resin and from about 4 parts to about 1 part by weight of a compatible synthetic elastomer selected from the group consisting of copolymers of butadiene and styrene, copolymers of butadiene and acrylonitrile and mixtures thereof.

2. A strong, tough twine having superior knot strength and knot holding ability consisting in a plurality of glass fibers bonded into a cohesive mass by a matrix consisting of an admixture in the range from about 1 to about 2 parts by weight of a high melting point thermoplastic resin and from about 4 parts to about 1 part by weight of a compatible synthetic elastomer selected from the group consisting of copolymers of butadiene and styrene, copolymers of butadiene and acrylonitrile and mixtures thereof.

3. A strong, tough twine having superior knot strength and knot holding ability consisting in a plurality of continuous strands of glass fibers twisted together longitudinally and bonded together into a cohesive mass by a matrix consisting of an admixture in the range from about 1 to about 2 parts by weight of the residue remaining after separation of refined rosin from the resinous extract of pine wood, said residue being characterized by substantial insolubility in petroleum hydrocarbons, and from about 4 parts to about 1 part by weight of a compatible synthetic elastomer selected from the group consisting of copolymers of butadiene and styrene, copolymers of butadiene and acrylonitrile and mixtures thereof.

4. A strong, tough twine having superior knot strength and knot holding ability consisting in a plurality of continuous strands of glass fibers twisted together longitudinally and bonded together into a cohesive mass by a matrix consisting of an admixture in the range from about

*Table of Examples*

| Example Number | Constituents (See Note i) | | Percentage (See Note ii) | | Strand, yds./lb./100 | No. of Strands | Percent Impregnant in Twine | Knot Strength (lbs.) | Surface and other Characteristics |
|---|---|---|---|---|---|---|---|---|---|
| | A | B | A | B | | | | | |
| 1 and 2 | 1 | 1 | 5 | 10 | 150 | 120 | 18 | 170 | Surface good. |
| 3 | 1 | 1 | 5 | 10 | 150 | 240 | 15 | 265 | Good. Twine larger than necessary. |
| 4 and 5 | 2 | 2 | 20 | 10 | 150 | 120 | 16 | 140 | Surface poor. Needed waxing. |
| 6 | 1 | 2 | 7½ | 7½ | 150 | 120 | 9 | 139 | Surface good. |
| 7 | 1 | 2 | 5 | 10 | 150 | 120 | 9 | 146 | Do. |
| 8 | 1 | 2 | 10 | 5 | 150 | 120 | 9 | 141 | Do. |
| 9 | 2 | 1 | 5 | 10 | 150 | 120 | 7 | 115 | Surface poor. Low knot strength. |
| 10 | 1 | 1 | 5 | 10 | 75 | 55 | 7½ | 149 | Good surface. |
| 11 | 1 | 1 | 3 | 12 | 75 | 60 | 7 | 150 | Do. |

NOTE i.—Constituents used above:
A. 1. Pine rosin derivative. Emulsion in water. (40% solids); 2. Two step phenol-formaldehyde. Water solution (40% solids).
B. 1. Butadiene-styrene copolymer. Emulsion in water (40% solids); 2. Butadiene-acrylonitrile copolymer. Latex (40% solids).
NOTE ii.—In all cases the remainder of the impregnant was water.

1 to about 2 parts by weight of the residue remaining after seperation of refined rosin from the resinous extract of pine wood, said residue being characterized by substantial insolubility in petroleum hydrocarbons, and from about 4 parts to about 1 part by weight of a copolymer of butadiene and styrene.

References Cited in the file of this patent

UNITED STATES PATENTS

| | | |
|---|---|---|
| 340,315 | Holman | Apr. 20, 1886 |
| 537,518 | Anderton | Apr. 16, 1895 |
| 2,133,183 | Baird et al. | Oct. 11, 1938 |
| 2,133,238 | Slayter et al. | Oct. 11, 1938 |
| 2,184,899 | Shand | Dec. 26, 1939 |
| 2,224,274 | Powers | Dec. 10, 1940 |
| 2,234,986 | Slayter et al. | Mar. 18, 1941 |
| 2,245,824 | Roesch | June 17, 1941 |
| 2,293,918 | Planiol | Aug. 25, 1942 |
| 2,369,876 | Warren | Feb. 20, 1945 |
| 2,427,507 | Powell et al. | Sept. 16, 1947 |
| 2,485,019 | Somerville | Oct. 18, 1949 |
| 2,536,312 | Saether | Jan. 2, 1951 |
| 2,597,858 | Freedlander | May 27, 1952 |